US010013159B2

(12) United States Patent
Takahashi et al.

(10) Patent No.: US 10,013,159 B2
(45) Date of Patent: Jul. 3, 2018

(54) DRIVING SUPPORT INFORMATION DISPLAY CONFIGURATION AND DEVICE USING THE SAME

(71) Applicant: KUBOTA CORPORATION, Osaka (JP)

(72) Inventors: Keiji Takahashi, Osaka (JP); Susumu Umemoto, Osaka (JP); Eiji Nishi, Osaka (JP); Yoshihiro Kushita, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 236 days.

(21) Appl. No.: 14/867,557

(22) Filed: Sep. 28, 2015

(65) Prior Publication Data
US 2016/0202870 A1 Jul. 14, 2016

(30) Foreign Application Priority Data

Jan. 13, 2015 (JP) ................................. 2015-004396
Jan. 13, 2015 (JP) ................................. 2015-004397

(51) Int. Cl.
G06F 3/048 (2013.01)
G06F 3/0488 (2013.01)
G06F 3/0484 (2013.01)
G07C 5/06 (2006.01)
(Continued)

(52) U.S. Cl.
CPC ....... G06F 3/0488 (2013.01); B62D 49/0614 (2013.01); G06F 3/0482 (2013.01);
(Continued)

(58) Field of Classification Search
CPC ............... G06F 3/0488; G06F 3/04842; G06F 3/04847; G06F 3/04886; G06F 3/0482;
(Continued)

(56) References Cited

U.S. PATENT DOCUMENTS 6,028,765 A 2/2000 Swindler et al.
6,029,106 A 2/2000 Hale et al.
(Continued)

FOREIGN PATENT DOCUMENTS

EP 1714822 10/2005
JP H09-258895 10/1997
(Continued)

Primary Examiner — Jeffrey A Gaffin
Assistant Examiner — Ayesha Huertas Torres
(74) Attorney, Agent, or Firm — Greenblum & Bernstein, P.L.C.

(57) ABSTRACT

A driving support information display device includes a status display area controller, a menu display area controller, and a status information controller. The status display area controller manages a status display area having a plurality of status display sections arranged vertically in one side area of a display screen. The menu display area controller manages an upper menu display area having a plurality of selection button sections arranged side by side in an upper area of the display screen and a lower menu display area having a plurality of selection button sections arranged side by side in a lower area of the display screen. The status information controller displays status information in the status display section by providing to the status display area controller status information relating to a functional module assigned to the selection button section that has been touch input.

20 Claims, 8 Drawing Sheets

(51) Int. Cl.
  *G07C 5/12* (2006.01)
  *H04M 1/725* (2006.01)
  *G06F 3/0482* (2013.01)
  *B62D 49/06* (2006.01)

(52) U.S. Cl.
  CPC ...... *G06F 3/04842* (2013.01); *G06F 3/04847* (2013.01); *G06F 3/04886* (2013.01); *G07C 5/06* (2013.01); *G07C 5/12* (2013.01); *H04M 1/72583* (2013.01); *B60R 2300/80* (2013.01); *G06F 2203/04803* (2013.01)

(58) Field of Classification Search
  CPC ..... G06F 2203/04803; B62D 49/0614; H04M 1/72583; G07C 5/12; G07C 5/06; B60R 2300/80
  See application file for complete search history.

(56) References Cited

U.S. PATENT DOCUMENTS

| | | |
|---|---|---|
| 7,337,023 B2 | 2/2008 | Diekhans |
| 8,370,742 B2 | 2/2013 | Hieronymus et al. |
| 2006/0069485 A1* | 3/2006 | Diekhans ............. A01D 41/127 701/50 |
| 2011/0205162 A1* | 8/2011 | Waller ................... B60K 35/00 345/173 |

FOREIGN PATENT DOCUMENTS

| | | |
|---|---|---|
| JP | 2004-234442 | 8/2004 |
| JP | 2008-027228 | 2/2008 |
| JP | 2012-230588 | 11/2012 |

* cited by examiner

DRIVING SUPPORT INFORMATION DISPLAY CONFIGURATION AND DEVICE USING THE SAME

CROSS-REFERENCE TO RELATED APPLICATIONS

The present application claims priority under 35 U.S.C. § 119 of Japanese Application Nos. 2015-004396 and 2015-004397, both filed on Jan. 13, 2015, the disclosures of which are expressly incorporated by reference herein in their entirety.

BACKGROUND OF THE INVENTION

1. Field of the Invention

The present invention relates to a driving support information display device provided in a work vehicle having a plurality of functional modules for work travel.

2. Description of Related Art

A driver driving a work vehicle such as a tractor or a combine needs to check working information relating to a work apparatus provided in the work vehicle and traveling information such as engine revolutions, cooling water temperature, and speed change position; and set a parameter setting that can be set. Therefore, a cockpit of the work vehicle is provided with a driving support information display device displaying this information.

A display device disclosed in U.S. Pat. No. 7,337,023 can display various information by dividing a screen into a plurality of sections. For example, small selection sections with icons are provided in a lower side area and by touching a specific selection section, the selection section is highlighted and detailed information assigned to the selection section is displayed on a large display section. In U.S. Pat. No. 7,337,023, a zoom operation is provided to display information for many display items and other information can be displayed in a margin created by shrinking a basic information display section for displaying basic information to a lower left direction of the screen.

However, in the display device for the work vehicle disclosed in U.S. Pat. No. 7,337,023, a section displaying detailed information assigned to a touch operated selection button is decided in advance. Therefore, as types of display information assigned to the selection buttons increase, the display sections displaying detailed information also increase in number, and there is a concern that each display section may become too small to see. In addition, in a case where a plurality of detailed information needs to be visually compared at the same time in various combinations, a concern also arises that it may not be easy to check the various sections displaying the detailed information against each other since the sections are not necessarily adjacent. In view of the above, there is a need for a driving support information display device provided with a user-friendly display screen having excellent or better efficiency for use as a screen for statuses of various functions in a work vehicle.

SUMMARY OF THE INVENTION

A driving support information display device according to the present invention, which is provided in a cockpit of a work vehicle having a plurality of functional modules for work travel, includes a display portion, a status display area controller, a menu display area controller, a main display area controller, and a status information controller. The display portion consists of a display part having a rectangular display screen and a touch input part provided on the display screen. The status display area controller manages a status display area having a plurality of status display sections vertically arranged in one side area of the display screen. The menu display area controller manages an upper menu display area having a plurality of selection button sections arranged side by side in an upper side area of the display screen and a lower menu display area having a plurality of selection button sections arranged side by side in a lower side area of the display screen. The main display area controller manages a main display area having a display area larger than the status display section, the main display area being surrounded by the status display area, the upper menu display area, and the lower menu display area. The status information controller displays the status information in the status display section by providing to the status display area controller status information relating to the functional module assigned to the selection button section that has been touch input.

According to this configuration, a plurality of selection button section each assigned to a display of status information for a specific functional module are arranged in the upper and lower areas of the display screen. Thus, status information assigned to the selection button section touch operated by a driver is displayed in one of the plurality of status display sections by the status display area controller. In other words, the selection button section serving as a selection button and the status display section displaying status information assigned to the selection button section are not decided beforehand, but rather, the status display area controller decides the status display section to be used. Therefore, there is no need to require as many status display sections as there are selection button sections. In addition, status information related to the functional module status information to be displayed can be displayed in the adjacent status display section. Further, the phrase "functional module" used in the present invention can, in embodiments, mean various devices mounted on the work vehicle and combinations thereof, and physical values (speed, revolutions, location, and the like) of each device and status of an associated switch, sensor, or the like are included in the status information.

When touch operating by selecting the selection button section arranged in the upper menu display area or the lower menu display area while driving the work vehicle, operation error is likely to occur when the vehicle vibrates. One of the strategies for facilitating touch operation is to stabilize a hand by applying fingers other than a thumb on a top side of the display portion and by touch operating with the thumb of the hand the selection button section arranged in the upper menu display area or the lower menu display area. Therefore, in one aspect of the present invention, a size of the display screen is defined so as to enable touch input with respect to the selection button section using the thumb of the hand supported by an upper edge of the display part. In this case, in another aspect of the present invention, when a non-slip part for resting fingers is formed on the upper edge of the display part, accurate operation is possible as the thumb of the hand performing touch input with respect to the selection button section becomes more stable.

Through the touch input with respect to the selection button section as the selection button, status information assigned to the selection button section is displayed in one of the plurality of status display sections. In this case, the status display section displaying status information assigned to the selected selection button section is not decided beforehand. Therefore, when an indicator to associate the corresponding selection button section and status display section is provided, association thereof is facilitated, which is preferred. For this purpose, in another aspect of the present invention, identification information relating to the selection button section that has been touch input and the status display section displaying status information relating to the functional module assigned to the selection button section is displayed in both sections. Examples of identification information can include concrete forms respectively assigning a common letter, symbol, or illustration and abstract forms assigning a color, a belt-shaped line, or the like. An example using a common color for each corresponding selection button section and status display section is to draw a section frame allowing intuitively easy viewing.

It is preferable for the driver to be able to freely decide the status display section displaying status information assigned to the selected selection button section from among the plurality of status display sections. To achieve this, in another aspect of the present invention, the status information is displayed in the status display section specified by a touch input with respect to the status display area as a second touch input following a touch input with respect to the selection button section as a first touch input. Accordingly, for example, in a case where a plurality of status information needs to be compared, such plurality of status information can be displayed in mutually adjacent status display sections.

Desired functional module status information is preferably displayed in a main display area having a display surface area larger than the status display section in order to check the contents more accurately. In addition, the main display area having the large display surface area is suitable not only for a simplistic display of functional module status information, but also for setting a parameter controlling the functional module status. Examples include settings such as engine revolutions, lift range of a work apparatus, and the like. Therefore, in another aspect of the present invention, a functional module settings controller is provided displaying the settings screen information in the main display area by giving the main display area controller parameter setting screen information for the functional module assigned to the selection button section that has been touch input. As a specific configuration to display such functional module status information in the main display area, in another aspect of the present invention, a display of the settings screen information in the main display area is executed by the touch input with respect to the main display area as the second touch input following the touch input with respect to the selection button section as the first touch input.

The driving support information display device according to the present invention, which is provided in the cockpit of the work vehicle having the plurality of functional modules for work travel, includes the display portion including the display part having the display screen, the status display area controller managing the status display area having the plurality of status display sections arranged in the display screen, and the menu display area controller managing the lower part menu display area having the plurality of selection button sections arranged in the display screen. The driving support information display device displays, in the selected status display section, status information relating to the functional module assigned to the selection button section selected by the driver's operation, and identification information relating to the selected selection button section and the selected status display section is displayed in both sections.

According to this configuration, in the driving support information display device according to the present invention, status information which is selected and displayed by the operation with respect to the selection button section as the selection button is displayed in one of the plurality of status display sections. In this case, the operated selection button section and the status display section displaying the status information assigned to the selection button section are associated using by identification information. Accordingly, the driver can easily associate the operated selection button section and the status information displayed by the operation. Examples of identification information can include concrete forms respectively assigning a common letter, symbol, or illustration and abstract forms assigning a color, a belt-shaped line, or the like. Specifically, the identification information is preferably drawn in a belt-shaped line, which has a different form for each status display section along at least a portion of a section border line between the selection button section and the status display section. Further, another aspect of the present invention is to draw the section frame of each of the corresponding selection button section and status display section using a common color, allowing intuitively easy viewing. Furthermore, the phrase "functional module" used in the present invention can, in embodiments, mean various devices mounted on the work vehicle and combinations thereof. The status information includes physical values (speed, revolutions, location, and the like) of each device and status of an associated switch, sensor, or the like.

In another aspect of the present invention, the display portion includes a touch input part provided on the display screen, and selection of the selection button section is performed by touch input to the selection button section as the first touch input and selection of the status display section is performed by the touch input with respect to the status display area as the second touch input following the first touch input. In this configuration, the driver first touches the selection button section as the selection button selecting a type of status information to display, then touches the status display section located at a place where the status information is to be displayed, and desired status information is displayed at a desired position. Further, in a case where a plurality of status information is to be compared, such plurality of status information can be displayed in mutually adjacent status display sections. Accordingly, a preferable user interface is realized in which the driver can freely decide the status display section displaying the status information assigned to the selected selection button section.

Desired functional module status information is preferably displayed in the main display area having the display surface area larger than the status display section in order to check the contents more accurately. In addition, the main display area having the large display surface is suitable not only for displaying functional module status information, but also for performing the parameter setting controlling functional module status. For example, settings such as engine revolutions, lift range of the work apparatus, and the like. Therefore, in another aspect of the present invention, the main display area having the display surface area larger than the status display section is managed by the main display area controller and is arranged in the display screen. In a case where the second touch input is performed with respect to the main display area, the functional module settings controller is provided displaying the settings screen information in the main display area by providing, to the main display area controller, the parameter setting screen information for the functional module assigned to the selection button section touch input as the first touch input. Accordingly, a task such as setting the parameter can be performed smoothly.

In another aspect of the present invention, the display screen is rectangular and the plurality of status display sections are arranged vertically in one side area of the display screen; the plurality of selection button sections are arranged side by side in the upper menu display area arranged in the upper side area of the display screen and the lower menu display area arranged in the lower side area of the display screen; and the main display area is surrounded by the status display area, the upper menu display area, and the lower menu display area. In a case where the selection button sections arranged in the upper menu display area and the lower menu display area are selected and touch operated while driving the work vehicle, operation error is like to occur when the vehicle vibrates. However, according to the configuration described above, it is possible to stabilize a hand by applying fingers other than the thumb on the top side of the display portion and to touch operate with the thumb of the hand the selection button section arranged in the upper menu display area or the lower menu display area. The thumb of the hand attempting to perform touch input with respect to the selection button section is more stable, enabling accurate operation.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
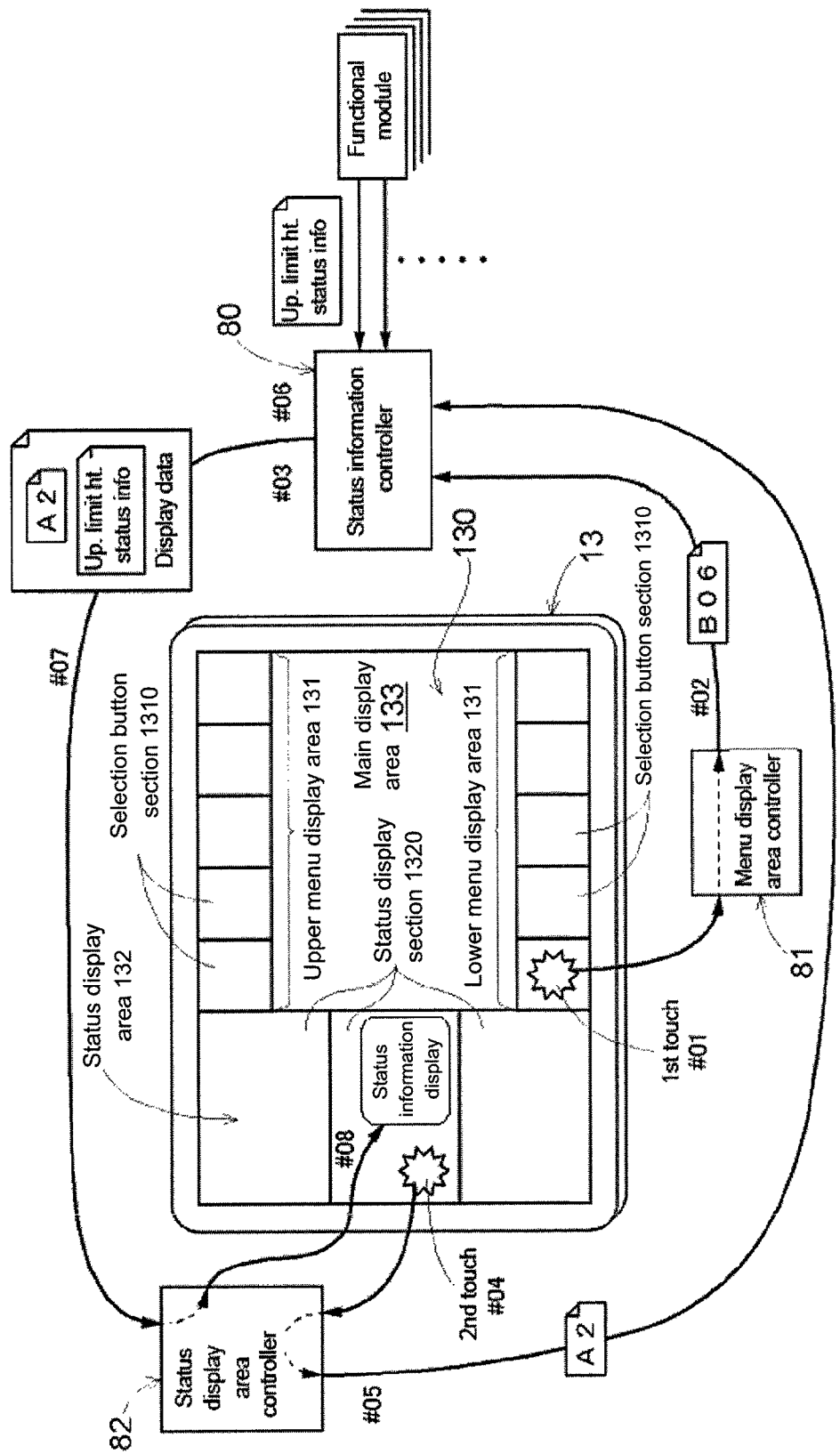
FIG. 1 is a schematic view of a configuration of a display screen of a driving support information display device for a work vehicle according to the present invention, and illustrates a flow for controlling information display on the display screen.
Figure 2:
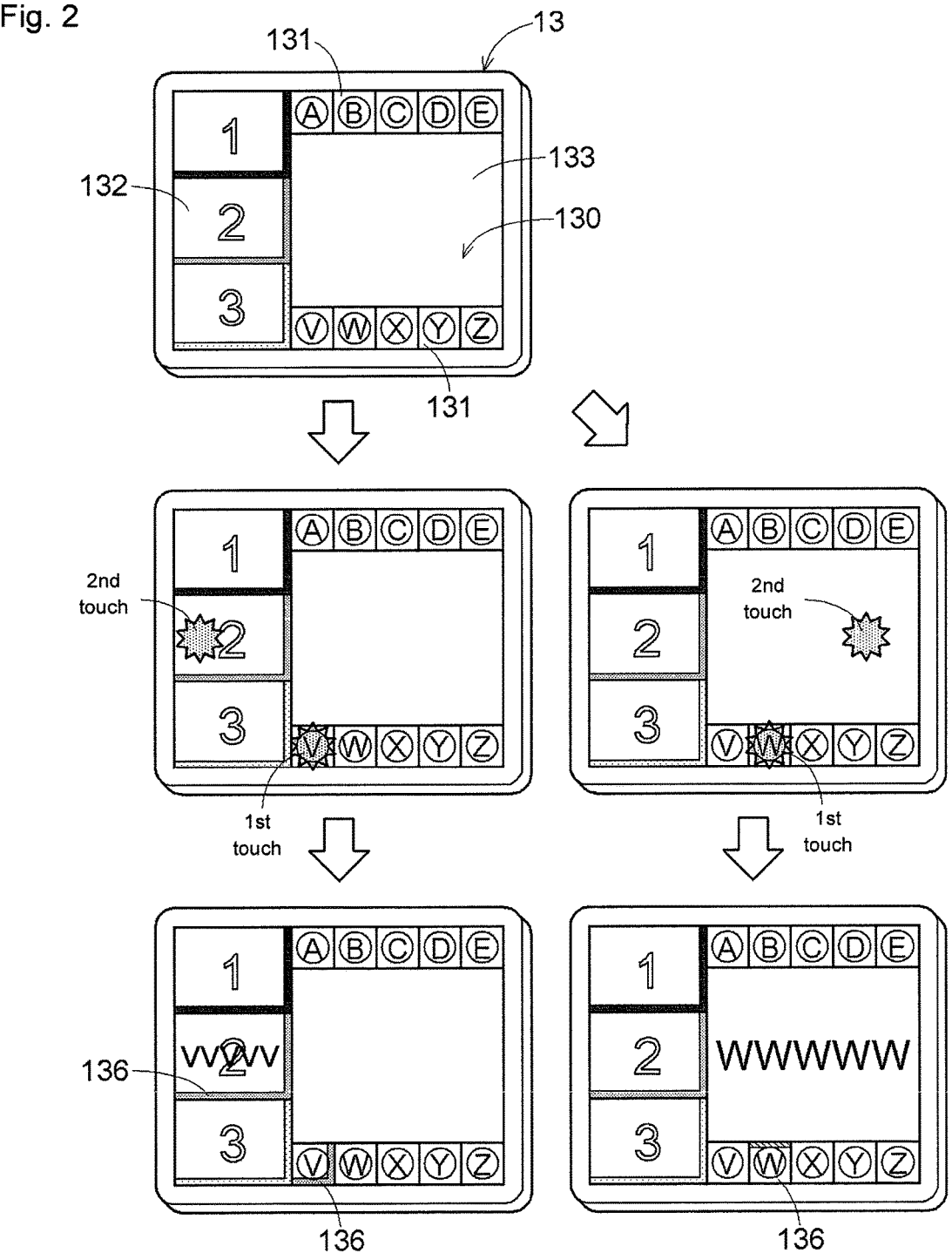
FIG. 2 illustrates a transition of the information display based on a first touch operation and a second touch operation.

Before describing a specific embodiment of a driving support information display device for a work vehicle according to the present invention, basic features of the present invention are described with reference to FIGS. 1 and 2. FIG. 1 illustrates a configuration of a display screen of the driving support information display device installed in a cockpit of the work vehicle and an exemplary flow for controlling information display on the display screen. FIG. 2 illustrates a transition of the information display based on a first touch operation and a second touch operation for a particular section of the display screen.

In this example, a display portion 13 of a driving support information display device is a touch screen liquid crystal display located in the cockpit of the work vehicle. Display content is changed by touch input from a driver with respect to a display screen 130 surrounded by a rectangular frame body 13a (see FIG. 4). In the example shown in FIG. 1, the display screen 130 is divided into menu display areas 131 located in upper and lower areas of the display screen, a status display area 132 located in a left side area, and a main display area 133 that is a multifunction display area having the largest area surrounded by the menu display areas 131 and the status display area 132. Five selection button sections 1310 are arranged side by side in each of the upper menu display area 131 (menu display area located in the upper area) and the lower menu display area 131 (menu display area located in the lower area). The selection button sections 1310 operate as selection buttons. An icon indicating the particular content assigned to each selection button is provided on the surface of the button, but is omitted in FIG. 1. In the example of FIG. 2, alphabetic letters are assigned instead of icons. The status display area 132 includes three status display sections 1320 arranged vertically (see FIG. 7). Each status display section 1320 displays status information specified by the selection button. The main display area 133 is capable of displaying more detailed status information specified by the selection button or a settings screen defining settings relating to the status information.

Each selection button section 1310 specifies status information to be displayed in the status display section 1320. In other words, status information assigned to the selection button section 1310 selected through touch operation of the selection button section 1310 is displayed in any one of the status display sections 1320 of the status display area 132. In that case, the status display section 1320 displaying the status information is selected by touch operation. Further, a series of selection button sections 1310 arranged in the upper menu display area 131 and a series of selection button sections 1310 arranged in the lower menu display area 131 are preferably sorted based on affiliated tasks and operations.

Hereafter, an exemplary flow of controls relating to the status information display by touch operation is described with reference to FIG. 1. First, touch operation is performed with respect to the selection button section 1310 assigned to the status information to be displayed (#01). An initial touch operation is treated as a first touch input in the present specification for the purposes of the controls. Through the first touch operation, an ID or signal (indicated by B06 in FIG. 1) specifying the selection button section 1310 that has been touch operated is sent to a status information controller 80 through a menu display area controller 81 (#02). Status information for various functional modules provided in the work vehicle is sent to the status information controller 80. Thus, status information specified by the first touch operation is read from among these (#03). In this example, the status information is an upper limit height of a work apparatus that is lift operated.

Next, to specify the status display section 1320 displaying the status information selected by the first touch operation, a touch operation is performed with respect to a desired status display section 1320 (#04). In the present specification, the touch operation following the first touch input is treated as a second touch input. Through the second touch operation, an ID or signal (indicated by A2 in FIG. 1) specifying the status display section 1320 that has been touch operated is sent to the status information controller 80 through a status display area controller 82 (#05). In this example, the status display section 1320 with the ID of A2 corresponds to a second section of area 132.

The status information controller 80 associates the status information read through the first touch operation to the status display section 1320 specified through the second touch operation (#06). The status information controller 80 sends display data to the status display area controller 82 to display the status information in the status display section 1320 (#07). Accordingly, information relating to the upper limit height of the work apparatus is displayed in the status display section 1320 which is second from the top (#08) or area 132.

Next, an exemplary transition of the content displayed by the first and second touch operations is described with reference to FIG. 2. Further, in the example of the display screen 130 in FIG. 2, three identifiable belt-shaped lines 136 are respectively assigned to a lower right corner of each status display section 1320 of area 132 which are distinguished with a number. The selection button sections 1310 are assigned alphabetic letters instead of icons as identifiers. In this example, the five selection button sections 1310 (indicated by alphabetic letters A to E) arranged in the upper menu display area 131 are assigned to display status information related to traveling systems of the work vehicle, and the five selection button sections 1310 (indicated by alphabetic letters V to Z) arranged in the lower menu display area 131 are assigned to display status information related to working systems of the work vehicle.

The upper part of FIG. 2 illustrates the display screen 130 prior to the touch operation. In this state, as shown on a left side of the middle part of FIG. 2, the first touch operation is performed with respect to the selection button section 1310 indicated with "V" and the second touch operation is performed with respect to the status display section 1320 indicated with "2." As a result, status information (indicated with "VVVVV") specified by the first touch is displayed in the status display section 1320 placed second from the top or area 132, and indicated with "2." Furthermore, the belt-shaped line 136 having the same form (same pattern and color, for example) with the belt-shaped line 136 assigned to the status display section 1320 placed second from the top is assigned to the lower right corner of the selection button section 1310 as the object of the first touch operation. Accordingly, a linked and/or visual relationship of the selection button section 1310 which is the object for the first touch operation and the status display section 1320 displaying operation information assigned to the selection button section 1310 can be easily confirmed from the display screen 130.

In an example illustrated on a right side of the middle part of FIG. 2, the first touch operation is performed with respect to the selection button section 1310 indicated with "W" and the second touch operation is performed with respect to the main display area 133. As a result, status information (indicated by "WWWWW") specified by the first touch is displayed in the main display area 133. Identification information similar to that of the status display section 1320 may also be assigned to the main display area 133. For example, as shown in FIG. 2, in a case where the second touch operation is performed with respect to the main display area 133, a different line from the belt-shaped line 136 assigned to the status display section 1320 may be assigned, as an example of the identification information, on the upper side of the selection button section 1310 where the first touch operation was performed. Status information displayed in the main display area 133 may include settings screen information for setting a parameter, threshold value, and the like related to the status information. For example, in a case where the main display area 133 is touched after the selection button section 1310 assigned to the status information for the working height of the liftable work apparatus is touched, the main display area 133 can display the working height settings screen, which includes a current working height status, and defining the upper limit and lower limit of the working height can be set through the settings screen.

Figure 3:
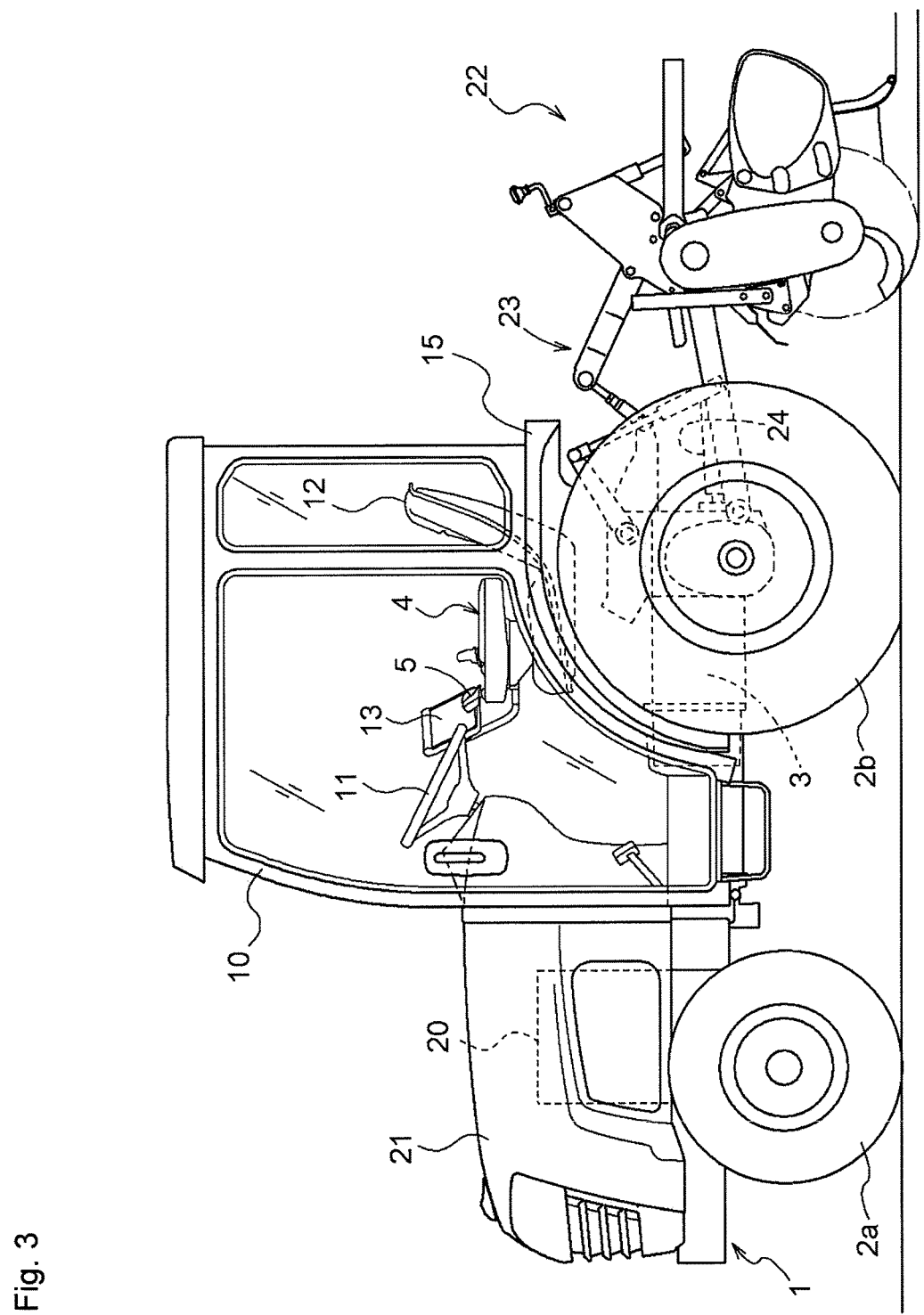
FIG. 3 is a side view of a tractor exemplary of a traveling vehicle in which the driving support information display device according to the present invention is installed.

Next, a specific embodiment of the driving support information display device according to the present invention is described. FIG. 3 is a side view of a tractor exemplary of the work vehicle in which the driving support information display device is installed. The tractor has a vehicle body 1 supported by front wheels 2a and rear wheels 2b, an engine 20 mounted in a front portion of the vehicle body 1, and a transmission 3 mounted rearward of the engine 20. A rotary tiller is mounted toward the rear of the vehicle body 1 and functions as a ground work apparatus 22. The rotary tiller is mounted so as to be movable in a vertical direction through a lift mechanism 23. The tractor is a four-wheel-drive vehicle and drive force of the engine 20 is transmitted, through a speed change mechanism installed in the transmission 3, to the rear wheels 2b and front wheels 2a, which are capable of acting as drive wheels. Moreover, the drive power of the engine 20 is also transmitted to the ground work apparatus 22 through a PTO shaft 24, which projects rearward from the transmission 3. The engine 20 is covered by a hood 21. A cabin 10 is supported on the vehicle body 1 to the rear of the hood 21 and above the transmission 3.

Figure 4:
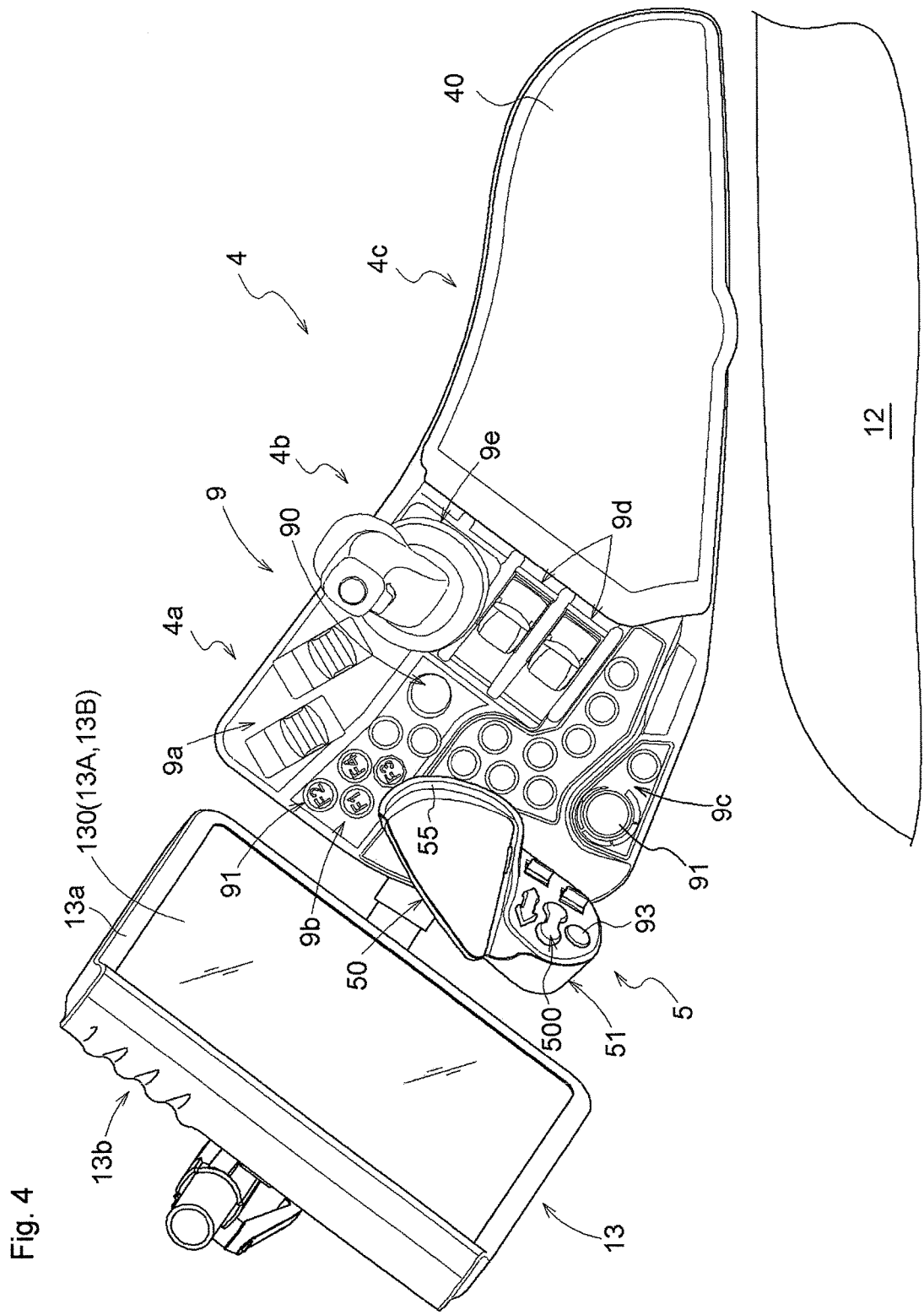
FIG. 4 is a plan or top view of an armrest operation device having a display portion configuring the driving support information display device.

An interior of the cabin 10 serves as a driver space, at a front portion of which is arranged a steering handle 11 steering the front wheels 2a and at a rear portion of which is arranged a driver seat 12, the driver seat 12 being positioned between a left-right pair of rear wheel fenders 15. An armrest operation device 4 having a multifunction operation tool 5 is provided spanning from a side of the driver seat 12 to a front side thereof. The display portion 13 visually notifying the driver of various information is provided forward of the armrest operation device 4. As shown in FIG. 4, the display portion 13 includes a liquid crystal display part 13A having the rectangular display screen 130 and a touch screen touch input part 13B provided on the display screen 130. The circumference of the display portion 13 is surrounded by the frame body 13a. On an upper edge of the frame body 13a, a non-slip part 13b is formed to stabilize the hand by placing fingers other than the thumb operating the touch screen.

The armrest operation device 4 can be divided in a plan view into a front area 4a, a middle area 4b, and a rear area 4c. A cushioning armrest bed 40 on which an arm is rested is provided to the rear area 4c. The multifunction operation tool 5, described in detail hereafter, is provided to substantially a left half of the front area 4a. A first operation switch group 9a and a second operation switch group 9b are provided as operation switch groups 9 to substantially a right half of the front area 4a. From the left, a third operation switch group 9c, a fourth operation switch group 9d, and a fifth operation switch group 9e are arranged as operation switch groups 9 on the middle area 4b. The operation switches provided to each of the operation switch groups 9 may have various forms such as a button, switch, dial, lever, joystick, or the like.

The second operation switch group 9b includes four shortcut buttons 91 and an increase/decrease dial 90. In the example shown in FIG. 4, the shortcut buttons 91 are assigned or labeled with symbols F1 to F4 on the surface. The shortcut button 91 causes the parameter setting screen to display in the main display area 133 to set the parameter setting that can be set, and a specific parameter setting is assigned to each shortcut button 91. The parameter settings displayed by pressing the shortcut buttons 91 are set using the increase/decrease dial 90. A setting value can be increased by turning the increase/decrease dial 90 clockwise, while the setting value decreases by turning the increase/decrease dial 90 counter-clockwise. When the setting task is completed, by pressing the shortcut button 91 again, the parameter setting screen disappears and the main display area 133 returns to an original display content. The operation such as the parameter setting assigned to the shortcut button 91 can be freely changed. Therefore, the operation can be assigned as desired according to the driver's level of experience, the particular ground work apparatus 22 mounted, work types, and the like. Accordingly, traveling maneuverability and working operability of the tractor improve.

Figure 5:
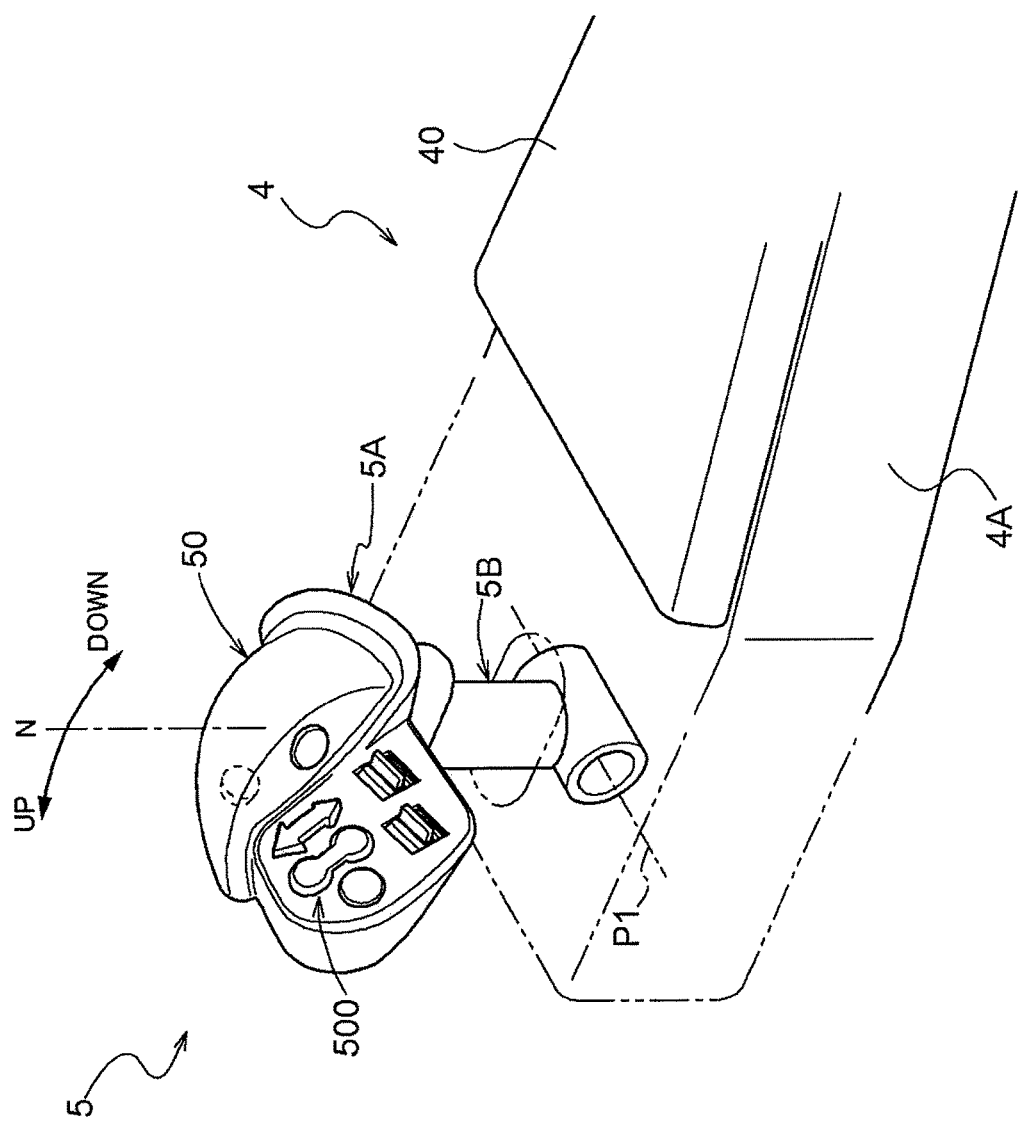
FIG. 5 is a perspective view of a multifunction operation tool arranged on the armrest operation device.

The multifunction operation tool 5 is arranged in a front end area on the left side of the armrest bed 40. As shown in FIG. 5, the multifunction operation tool 5 can be configured with a grip main body 5A and a pivoting body 5B, and is swingably supported around a swing axis P1.

As shown in FIGS. 4 and 5, the grip main body 5A includes a grip part 50 formed in a right side area and an extension part 51 formed in a left side area. A tab projecting outward is formed on a bottom edge of the grip portion 50 as a hypothenar rest 55. A group of switches 500 is arranged on the grip main body 5A.

Figure 6:
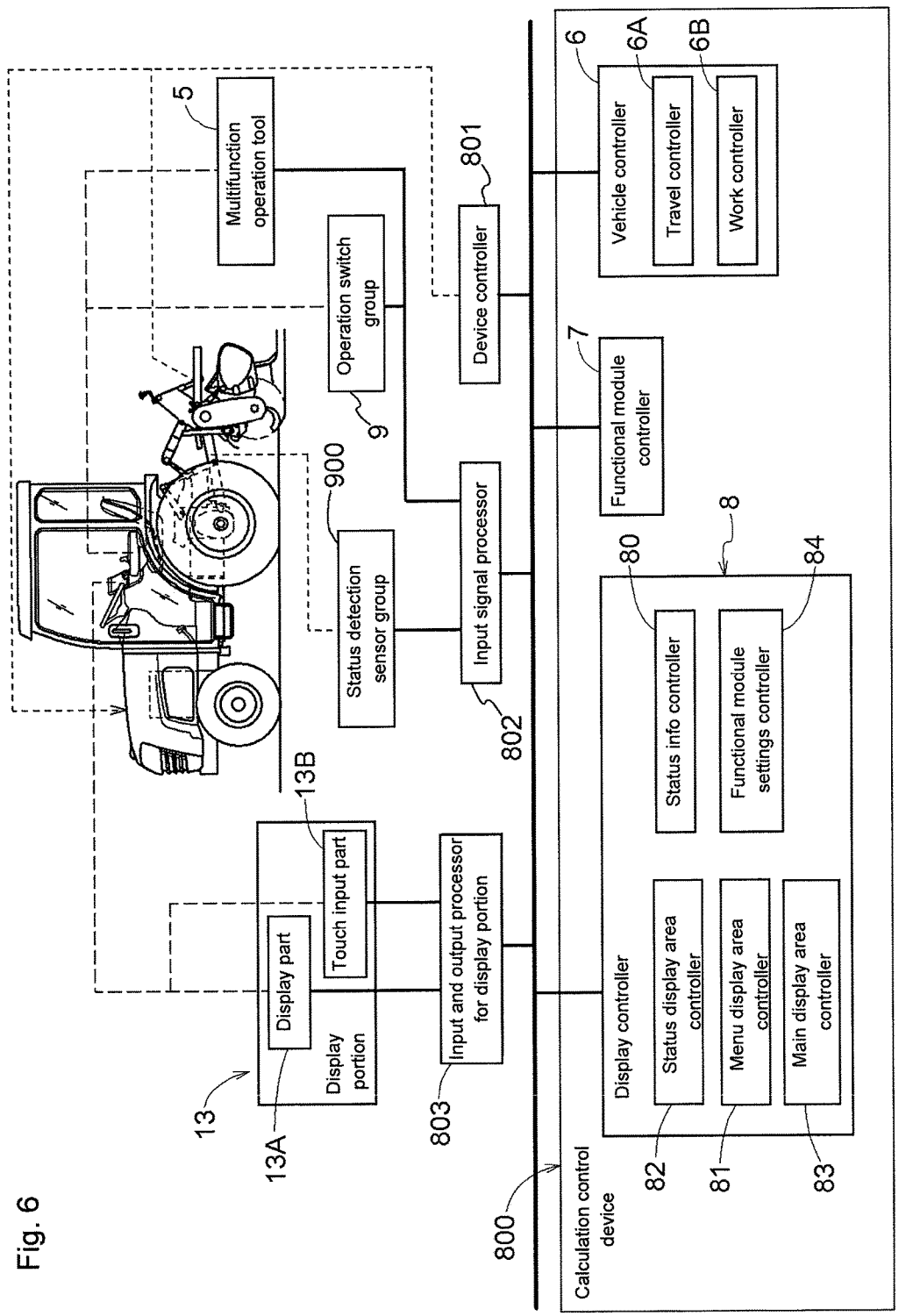
FIG. 6 is a functional block diagram of certain functions used in a control scheme of the tractor.

In FIG. 6, a control system equipped on the tractor is illustrated in the form of a functional block diagram. In the control system, functions achieved primarily by a computer program are represented as a calculation control device 800; however, this distinction is made purely for the purposes of description and the structure of an actual control system can be divided or consolidated as desired. The calculation control device 800 is connected to other portions or vehicle systems by an in-vehicle LAN or the like so as to be capable of data transmission. Examples of such portions include a device controller 801, an input signal processor 802, an input/output processor for a display portion 803, and the like. In addition, various functions and portions within the calculation control device 800 are also connected by the in-vehicle LAN or some other data transmission path so as to be capable of data transmission.

The device controller 801 provides operation signals to various operation devices provided to the engine 20, the transmission 3, the work apparatus 22, and the like, controlling the operation thereof. Various functions of the tractor are created by an individual operation device and the combination of operation devices, and therefore, the individual operation device and the combination of operation devices are referred to as functional modules. The input signal processor 802 is an input interface, inputting signals from the multifunction operation tool 5, the operation switch groups 9, and a status detection sensor group 900 as functional module status information and transferring the input signals to various portions of the control system. The input/output processor for the display portion 803 is an input/output interface, processing image signals output to the display part 13A of the display portion 13 and the input signals from the touch input 13B.

The calculation control device 800 shown in FIG. 6 includes a vehicle controller 6 having a travel controller 6A and a work controller 6B, a functional module controller 7, and a display controller 8. The travel controller 6A performs a vehicle speed control, engine control, and the like. The vehicle speed control creates a desired vehicle speed change ratio by outputting a speed change control command to the transmission 3 through the device controller 801. The engine control adjusts a number of engine revolutions by supplying a control command to an engine controller. The work controller 6B controls the lift mechanism 23 and the ground work apparatus 22 based on signals from the work-related operation buttons on the multifunction operation tool 5 and signals from the work-related operation switch groups 9. The functional module controller 7 manages various functions created by the individual operation device and the combination of operation devices. For example, the number of engine revolutions is set to one or more, and a command is sent to the engine controller shifting the number of engine revolutions to the set number of revolutions based on the operation signal from the operation switch groups 9. In addition, the functional module controller 7 manages the upper limit and the lower limit of the ground work apparatus 22.

Figure 7:
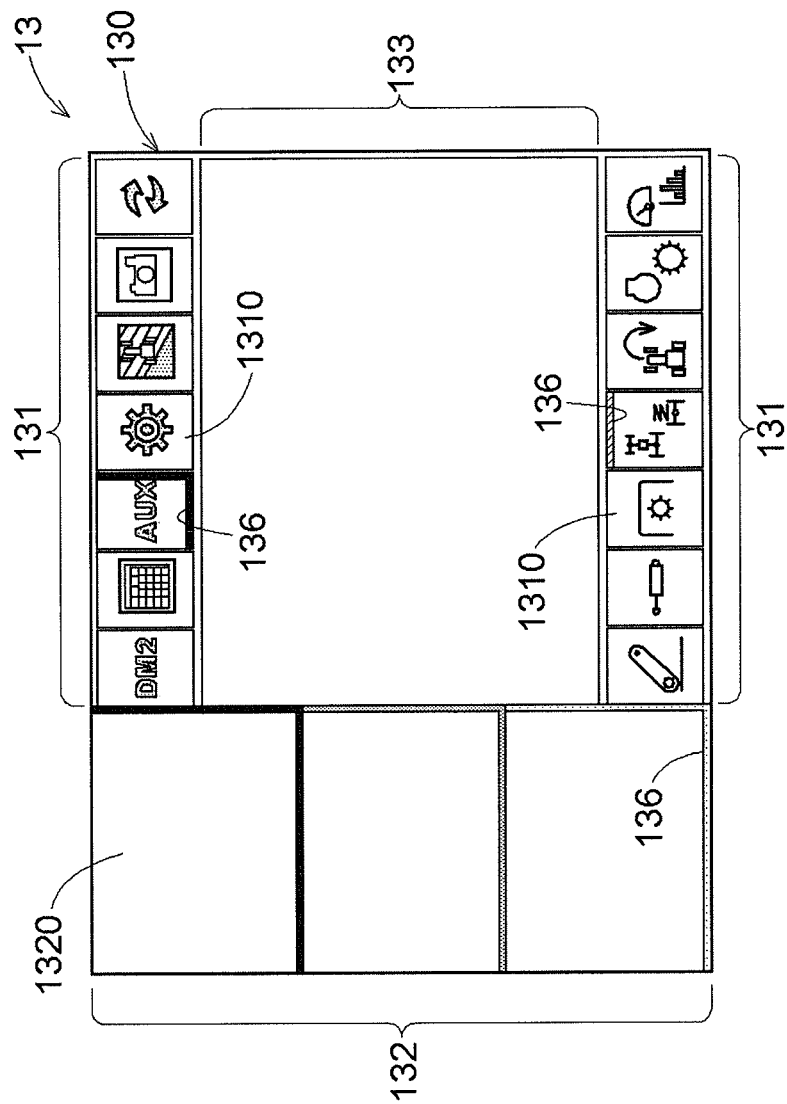
FIG. 7 is a screen image of an exemplary screen of the display portion.

The display controller 8 performs display control with respect to the display portion 13 and can basically achieve the display control operation as described with reference to FIGS. 1 and 2. FIG. 7 illustrates an example of an initial screen of the display screen 130 displayed in the display portion 13 by or using the display controller 8. Each of the upper menu display area 131 and the lower menu display area 131 of the display screen 130 includes seven selection button sections 1310. Each selection button section 1310 is provided with an icon representing the assigned status information. In the present example, the series of selection buttons 1310 arranged on the upper menu display area 131 and the series of the selection button sections 1310 arranged on the lower menu display area 131 are sorted based on affiliated tasks and operations. The status display area 132 located on the left side of the display screen 130 includes three status display sections 1320 and the color-coded belt-shaped line 136 is assigned to the frame on the lower right corner of each section. Although this cannot be confirmed from the figure, the belt-shaped lines 136 are, in embodiments, separated or distinguished by color as red, green, and yellow. The main display area 133 surrounded by the menu display areas 131 and the status display area 132 occupies substantially half the area or display area of the display screen 130.

Referring back to FIG. 6, the display controller 8 includes the status information controller 80, the menu display area controller 81, the status display area controller 82, a main display area controller 83, and a functional module settings controller 84. As described above, the menu display area controller 81 manages the touch input with respect to the selection button sections 1310; the status display area controller 82 manages the touch input with respect to the status display sections 1320; and the main display area controller 83 manages the touch input with respect to the main display area 133. The status information controller 80 displays the status information (including the parameter setting screen) relating to the functional module assigned to the selection button section 1310, which was specified by the first touch input, in the status display section 1320 specified by the second touch input or in the main display area 133. Further, the status information displayed in the main display area 133 also includes a corresponding functional module setting screen. The functional module settings controller 84, in conjunction with the functional module controller 7, manages the touch input of the parameter settings and the like through the settings screen displayed in the main display area 133.

Further, although not illustrated in FIG. 7, in a lower right corner of the selection button section 1310 specified by the first touch input, a belt-shaped line 136 can be provided having the same color as the belt-shaped line 136 assigned to the status display section 1320 specified by the second touch input.

Figure 8:
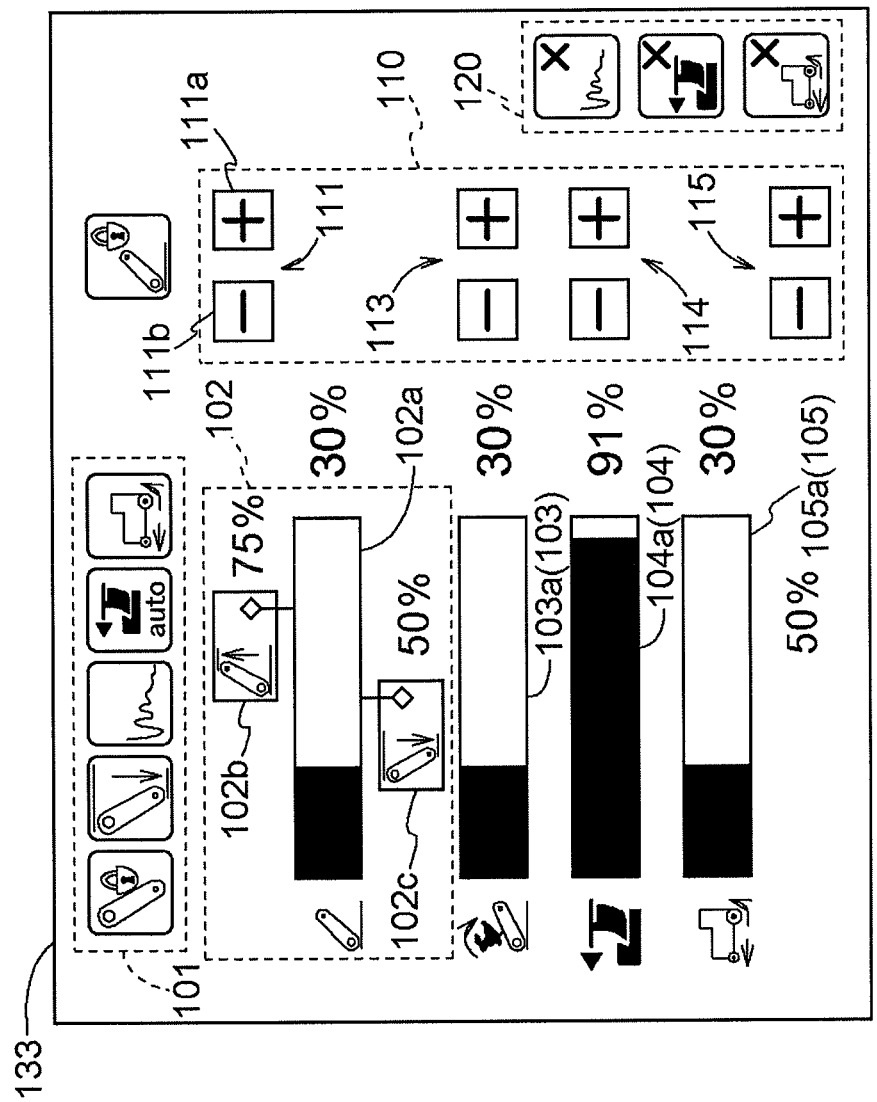
FIG. 8 is a lift control setting screen image of exemplary status information displayed on a main display screen of the display portion.

FIG. 8 illustrates an exemplary settings screen displayed in the main display area 133. The settings screen is a status display screen and a settings screen for lift control of the ground work apparatus 22. On a left half of the screen, from the top, there is shown a status display icon display area 101, a lift status display area 102, a lift speed display area 103, a reverse depth display area 104, and a slip quantity display area 105. To the right near the center of the lift control screen, there is shown an increase/decrease button display area 110. Further, on the right edge of the lift control screen, a various switches display area 120 is arranged.

On the lift status display area 102, a lift height display meter 102a represented as a horizontal bar chart, an upper limit display symbol 102b, and a work position (tilling height) symbol 102c are displayed. A left side of the lift height display meter 102a indicates a lowering lift stroke edge and a right side indicates a lifting lift stroke edge. The actual height of the ground work apparatus 22 is indicated by filled-in color. Meanwhile, a numeric value is displayed in a percent indication (i.e., actual height in relation to lift stroke) on a right side of the lift height display meter 102a. An upper limit indicator is added to the upper limit display symbol 102b and the indicator shows an upper limit position of the lift stroke. A numeric value is displayed in a percent indication (i.e., upper limit in relation to the lift stroke) next to the upper limit display symbol 102b. A numeric value is also displayed as a percent indication (i.e., work position in relation to the lift stroke) next to the work position symbol 102c. In addition, an upper limit setting switch 111, to set the upper limit position, is arranged on the increase/decrease button display area 110 side by side to the upper limit display symbol 102b. The upper limit setting switch 111 is illustrated as a software switch having an upper limit increase switch 111a and an upper limit decrease switch 111b, and the upper limit positions can be adjusted by touch input to the switches 111a and 111b.

Further, a touch input function can be added to allow setting an upper limit by touching the lift status display area 102 directly with a finger. The touch input function can be used in place of or together with the upper limit setting switch 111. Specifically, a two touch configuration can be used where the touch operation function starts by a touch on the upper limit display symbol 102b, and a touched position on the lift height display meter 102a becomes a new upper limit position. In such a touch operation, due to a possibility of touching a lower position than the actual height, it becomes extremely important to prevent the upper limit from being set lower than the actual height according to the prevent invention. Furthermore, a configuration can be used, in place of the above-described two touch configuration, where the upper limit can be set by shifting sideways (swipe operation) while touching the lift height display meter 102a.

Display meters 103a, 104a, and 105a which can display a horizontal bar chart are also arranged respectively to display setting values inside the lift speed display area 103, the reverse depth display area 104, and the slip quantity display area 105. Further, a numeric value is displayed in a percent indication (in relation to the whole) on the right side of each horizontal bar chart. Furthermore, increase/decrease switches 113, 114, and 115 are also arranged to adjust the setting value.

An exemplary operation of the above-described shortcut button 91 and the increase/decrease dial 90 is described with reference to the settings screen in FIG. 8. In this example, one of the shortcut buttons 91 (temporarily called F1 button here) is assigned to the upper limit setting of the ground work apparatus 22 and another one of the shortcut buttons 91 (temporarily called F2 button here) is assigned to setting the work position (tilling height) of the ground work apparatus 22. When the F1 button, which is the shortcut button 91, is pressed, the lift height display meter 102a and the upper limit display symbol 102b are displayed, as shown in FIG. 8, in the main display area 133 in place of the contents previously displayed. Further, the upper limit position increases when the increase/decrease dial 90 is turned clockwise, while the lower limit position decreases when the increase/decrease dial 90 is turned counter-clockwise. When the F1 button is pressed again, the main display area 133 returns to the original display content. Similarly, when the F2 button which is the shortcut button 91 is pressed, the lift height display meter 102a and the tilling height symbol 102c are displayed, as shown in FIG. 8, in the main display area 133 in place of the contents previously displayed. Further, the tilling height rises by turning the increase/decrease dial 90 clockwise, while the tilling height lowers by turning the increase/decrease dial 90 counter-clockwise. When the F2 button is pressed again, the main display area 133 returns to the original display content. In a case where a lift operation is not provided in the mounted ground work apparatus 22, other operations such as setting a desired number of engine revolutions and the like can be assigned to the shortcut buttons 91 such as the F1 and F2 buttons. The setting task can be executed smoothly by reassigning the frequently used parameter settings to each shortcut button 91.

Other Embodiments (1) In the above-described embodiment, the status display sections 1320 have been arranged at the left side of the display screen 130; however, the status display sections 1320 may be arranged at the right side. In addition, the number of status display sections 1320 may be two, or four or more in addition to three.

(2) In the above-described embodiment, the selection button section 1310 input by the first touch input has been assigned with similar identification information as the identification information (for example, the belt-shaped line 136 in red at the lower right corner) which has been assigned to the status display section 1320 input by the second touch input. Instead, without setting identification information specific to each status display section 1320 in advance, identification information may be selected and provided that is common to both the selection button section 1310 input by the first touch input and the status display section 1320 input by the second touch input.

(3) The functional blocks shown in FIG. 6 are merely for illustration purposes. The respective functional components can be consolidated or divided as desired. In particular, the respective functional elements configured in the calculation control device 800 are linked to each other by software, and therefore in many practical cases duplication of these elements is common. The functional elements illustrated in FIG. 6 are only displayed schematically and are not limited to the divisions illustrated in FIG. 6.

INDUSTRIAL APPLICABILITY

In addition to tractors, the driving support information display device according to the present invention can also be mounted in agricultural vehicles such as rice transplanters and combines, and construction vehicles such as front loaders.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A driving support information display device usable in a cockpit of a work vehicle, comprising:
   a touch screen display comprising a display screen;
   a status display area controller managing a status display area having a plurality of status display sections arranged vertically in one side area of the display screen;
   a menu display area controller managing an upper menu display area having a plurality of selection button sections arranged side by side in an upper area of the display screen and a lower menu display area having a plurality of selection button sections arranged side by side in a lower area of the display screen;
   a main display area controller managing a main display area having a display surface area larger than the status display section, the main display area being arranged adjacent the status display area, the upper menu display area, and the lower menu display area; and
   a status information controller communicating with the status display area controller,
   wherein the display screen displays at least status information relating to a function assigned to a touch screen selected input of the selection button section.

2. The device of claim 1, wherein the display screen displays status information relating to multiple functions of the work vehicle.

3. The device of claim 1, wherein the display screen is a rectangular display screen.

4. The device of claim 1, wherein the main display area is surrounded on a number of sides by the status display area, the upper menu display area, and the lower menu display area.

5. The device of claim 1, wherein the display comprises a hand support portion configured to allow touch input with a user's thumb.

6. The device of claim 1, wherein the hand support portion is a non-slip zone located on an upper edge of the display.

7. The device of claim 1, wherein an indicating is displayed on the status display area when the displayed status information relating to a function assigned to a touch screen selected input of the selection button section.

8. The device of claim 1, wherein the status display area is configured to display a visual indication corresponding to the displayed status information relating to a function assigned to a touch screen selected input of the selection button section.

9. The device of claim 1, wherein the status display area is configured to display:
   a first visual indication corresponding to a first touch screen selected input of the selection button section; and
   a second visual indication corresponding to a second touch screen selected input of the selection button section.

10. The device of claim 1, wherein the first and second touch screen selected inputs of the selection button section are touch screen buttons.

11. The device of claim 1, further comprising a functional module settings controller configured to provide displayable information comprising settings screen information displayable on in the main display area.

12. The device of claim 1, wherein the status display area and the upper and lower areas of the display screen each comprise plural touch screen buttons.

13. The device of claim 1, wherein the main display area, the status display area and the upper and lower areas of the display screen each comprise touch screens.

14. The device of claim 1, wherein the device is configured to display settings screen information in the main display area based on touch input to the main display area.

15. A driving support information display device usable in a cockpit of a work vehicle, comprising:
   a display having a display screen;
   a status display area controller managing a status display area having a plurality of status display sections arranged in the display screen; and
   a menu display area controller managing a menu display area having a plurality of selection button sections arranged in the display screen,
   wherein visual status information relating to a function associated with a user selected selection button section is displayed in both the status display area and the menu display area.

16. The device of claim 15, wherein at least one of:
   the display is a touch screen display; and
   the status display area and the menu display area are touch screens.

17. The device of claim 15, wherein the visual status information relating to a function associated with a user selected selection button section comprises one of:

a band;
a belt;
a perimeter line;
a border line;
a color line or band whose color is different from a surrounding section of the display screen; and
lines meeting at a button corner.

18. The device of claim 15, wherein the main display area is larger than the status display area.

19. The device of claim 15, wherein the display screen is rectangular and the plurality of status display sections are arranged vertically in one side area of the display screen and the menu screen comprises a plurality of selection button sections arranged side by side in both an upper menu display area and a lower menu display area.

20. A driving support information display device usable in a cockpit of a work vehicle, comprising:
a touch screen display comprising a display screen;
a status display area controller managing a status display area having a plurality of status display sections arranged on one side area of the display screen;
a menu display area controller managing a plurality of selection button sections arranged side by side in either or both of:
an upper area of the display screen; and
a lower area of the display screen;
a main display area controller managing a main display area of the display screen; and
a status information controller communicating with the status display area controller,
wherein the display screen displays status information relating to a work vehicle function in each of:
the status display area; and
one of the plurality of selection button sections.

* * * * *